United States Patent
Scherrer

(10) Patent No.: US 7,134,836 B2
(45) Date of Patent: Nov. 14, 2006

(54) TURBOCHARGER AND METHOD FOR ITS MANUFACTURE

(75) Inventor: Frank Scherrer, Ludwigshafen (DE)

(73) Assignee: BorgWarner Inc., Auburn Hills, MI (US)

( * ) Notice: Subject to any disclaimer, the term of this patent is extended or adjusted under 35 U.S.C. 154(b) by 53 days.

(21) Appl. No.: 10/726,874

(22) Filed: Dec. 3, 2003

(65) Prior Publication Data

US 2004/0109761 A1   Jun. 10, 2004

(30) Foreign Application Priority Data

Dec. 3, 2002   (EP)   ................... 02026896

(51) Int. Cl.
*F16J 15/00* (2006.01)
(52) U.S. Cl. ...................... 415/112; 415/229
(58) Field of Classification Search ................ 415/163, 415/203, 110, 112, 229; 417/406, 407, 405; 384/151
See application file for complete search history.

(56) References Cited

U.S. PATENT DOCUMENTS 4,735,556 A   4/1988   Fujikake et al.
5,154,578 A   10/1992  Miraucourt et al.
6,017,184 A * 1/2000   Aguilar et al. ............... 415/112

FOREIGN PATENT DOCUMENTS

DE   12 59 142 B   1/1962
GB   1 027 843     4/1966
GB   2 126 663 A   3/1984

* cited by examiner

*Primary Examiner*—Thomas E. Lazo
*Assistant Examiner*—Dwayne J White
(74) *Attorney, Agent, or Firm*—Akerman Senterfitt; Stephan A. Pendorf

(57) ABSTRACT

A housing unit for a turbocharger (1) comprises a rotor shaft (18) to mount a rotor on both its ends. Furthermore, there is a bearing housing part (4) for supporting the rotor shaft (18), and a turbine housing (2), an opening or recess of which facing an end portion (5) of the bearing housing (4). In this way, the end portion of the bearing housing (4) may be inserted into the opening or recess and may be fastened to the wall of the turbine housing (2) which delimit and surround the opening or recess. Within the region between the end portion of the bearing housing (4) and the turbine housing (2), at least one heat resistant sealing (17, 31) is provided which may be formed of a mineral material or of metal.

11 Claims, 4 Drawing Sheets

US 7,134,836 B2

TURBOCHARGER AND METHOD FOR ITS MANUFACTURE

FIELD OF THE INVENTION

The present invention relates to a turbo charger comprising a shaft for mounting one rotor on each end thereof, i.e. a turbine rotor and a compressor rotor, a bearing housing for supporting the rotor shaft, a turbine housing opposite the bearing housing wherein an end portion of the bearing housing is fastened on wall portions of the turbine housing which are adjacent to said opening.

Furthermore, the invention relates to a method for assembling such a turbocharger housing.

BACKGROUND OF THE INVENTION

Turbochargers having such a housing unit are known in the art, for example, from U.S. Pat. Nos. 4,780,054 or 5,146,752.

The requirements as to emission reduction are growing, as is known. One of the causes of increasing ecological damage, that is to be avoided, is the so-called "blow-by" effect wherein exhaust gas from the turbine housing flow to the suction side of the compressor. Numerous suggestions have been made to prevent such flow. On the other hand, more and more fun mobiles come onto the market which are not thought to run on normal streets, but driven in the middle of cross-country, for example through watercourses and ponds. Certainly, the exhaust gas pressure prevents, in general, penetrating of water, but under normal conditions the vehicle should not be left in water when the motor is switched off.

SUMMARY OF THE INVENTION

It is an object of the present invention to improve the sealing of a turbocharger.

In order to achieve this object, the invention uses a housing unit as defined above, because the inventor has found that the problem can be solved in the easiest way with this type of housing units. Of course, and this constitutes another problem which prevented a solution up to now, the interior of a turbine housing can be reach temperatures up to 900° C. in which case normal sealings, as used in the prior art for a variety of purposes, would fail.

The above object is achieved according to the invention in combination with the characteristics mentioned at the outset by providing at least one heat resistant sealing in the region between the end portion of the bearing housing and the turbine housing.

If now this sealing is provided between the end portion and turbine housing, it is advantageous to have a bearing housing which includes an end flange which may be inserted into a corresponding recess of the wall of the turbine housing, and that the sealing, which may consist of a mineral material or a metal, is arranged between the end flange and that portion of the wall of the turbine housing which delimits this recess. In such a case, the sealing may comprise a sealing ring that engages the outer surface of the end flange, particularly the peripheral surface thereof. However, the outer surface may, within the scope of the present invention, also be constituted by a stepped surface or shoulder. An alternative is to provide a sealing ring which engages an outer surface facing the turbine housing, for example being accommodated within an axial groove, e.g. of the flange (or of the wall of the turbine housing or both). In this manner, the sealing ring could be pressed in axial direction when assembling the housing unit. Of course, it is possible within the scope of the invention to use both approaches mentioned above.

Furthermore, the inventor has surprisingly found that with turbochargers having a guiding grid of variable geometry a not inconsiderable leakage flow streams transversely through the bearing of the adjustment shaft for adjusting this variable geometry. Therefore, it has been found favorable if the adjustment shaft is supported in a sub-divided sleeve-like bearing, either on the bearing housing and/or on the turbine housing, and a heat resistant seal, preferably of graphite, is inserted between the at least two portions of the sleeve-like bearing. This sealing is preferably deformable, for which reason graphite is particularly preferred.

If graphite is mentioned, it constitutes not only an optimum with respect to deformability, but provides also lubrication to the turning adjustment shaft. On the other hand, sealings, within the scope of the present invention, can be formed, e.g. of mica or graphite (or a combination thereof), or of a metal. In the case of a metal, the sealing will, in general, be similar to the sealing of a piston ring in a combustion motor or could have the shape of a snap ring.

As has been mentioned above, the invention relates also to a method of assembling a housing unit of a turbocharger, as will be described in detail below.

BRIEF DESCRIPTION OF THE DRAWINGS

Further details of the invention will become apparent from the following description of embodiments schematically illustrated in the drawings in which:

FIG. 2 is the detail II of FIG. 1 shown on an enlarged scale, but showing this detail under a different angle when turned around the longitudinal axis; whereas FIG. 3 is a preferred embodiment of the detail shown in FIG. 2, while

DETAILED DESCRIPTION OF THE DRAWINGS

Figure 1:
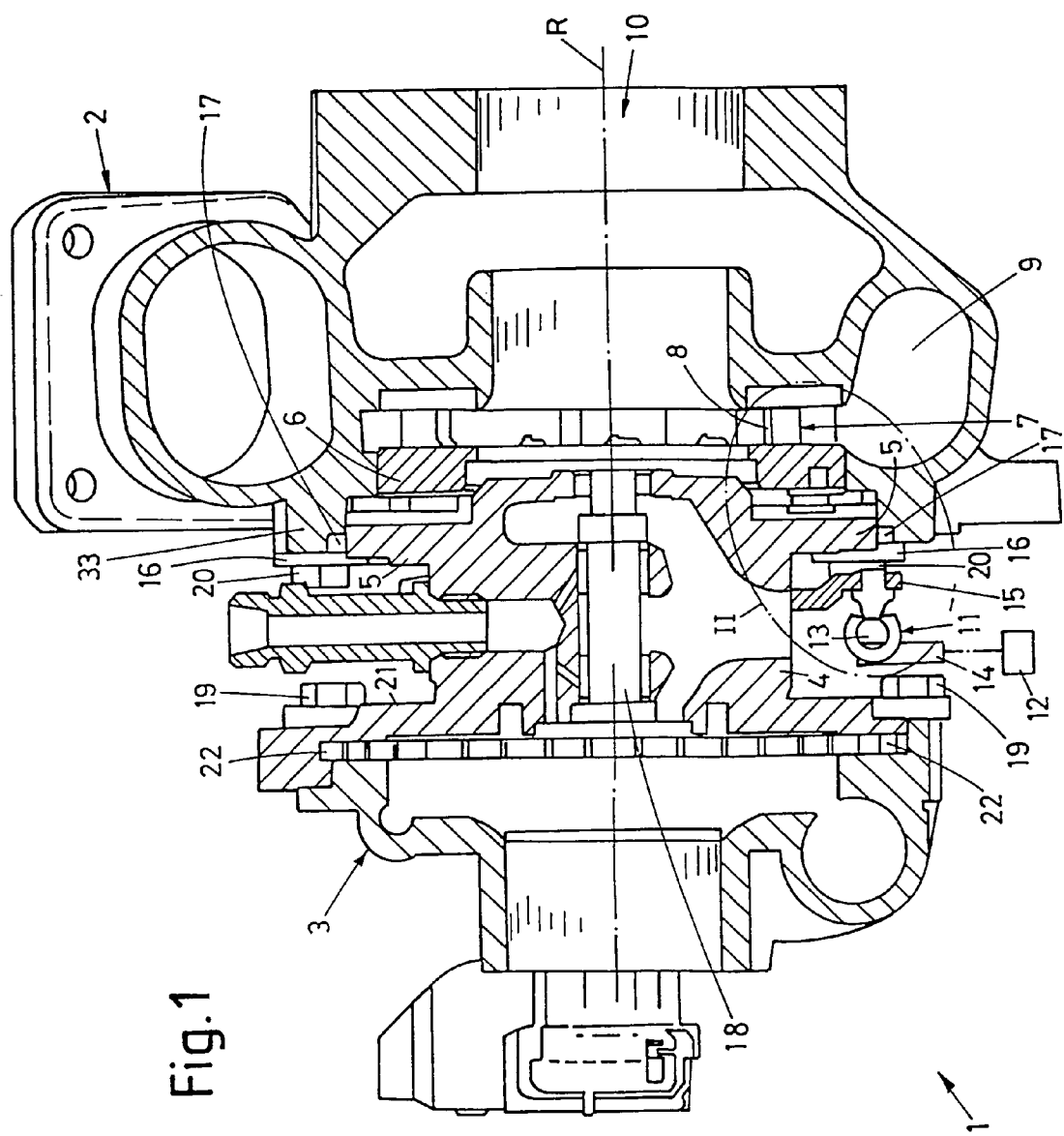
FIG. 1 is a cross-sectional view along the longitudinal axis or axis of rotation of a turbocharger housing unit according to the present invention.

According to FIG. 1, a turbocharger 1 comprises in conventional manner a turbine housing part 2, a bearing housing part 4 and a compressor housing part 3 connected to the latter. The three housing parts 2, 3, 4 are arranged along a longitudinal axis or axis of rotation R along which a rotor shaft 18 extends. To each one of the ends of the rotor shaft 18 a rotor will be mounted, i.e. a turbine rotor at the end within the turbine housing part 2 and a compressor rotor accommodated in the compressor housing part 3 at the other end of shaft 18.

The bearing shaft part 4 is fastened to the compressor housing part 3 around the longitudinal axis R by means of screw bolts 19 and to an opening or recess formed and delimited by a wall 33 of the turbine housing part 2 by means of threaded bolts 20. A sealing ring 22 is arranged between a fastening flange or end flange 21 of the bearing housing part 4 and the compressor housing part 3. This sealing ring 22 may be of conventional nature, because of the relative low prevailing temperatures at the side of the compressor.

Figure 2:
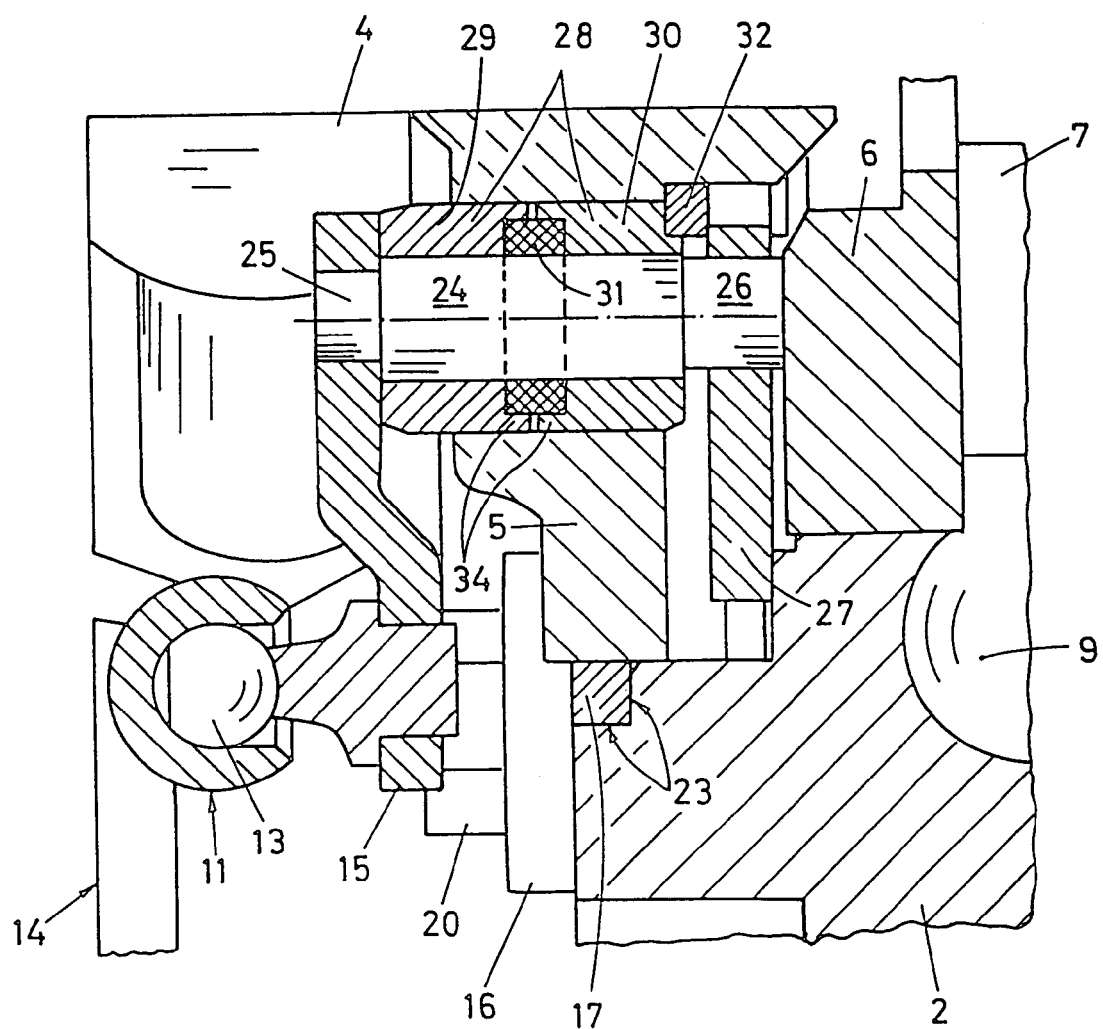

The turbine housing part 2 accommodates a nozzle ring 6 of a guiding grid of variable geometry known per se which comprises guiding vanes 7 distributed over its circumference. Thus, the guiding grid surrounds that space within the turbine housing part 2, which will receive the turbine rotor. The guiding vanes 7 have pivoting axes or shafts 8 penetrating through the nozzle ring 6 to turn about them so that each pair of adjacent vanes 7 form a nozzle of variable cross-section, the size of which varying according to the position of the guiding vanes 7, i.e. being oriented more in radial direction or more in tangential direction. In this way, the turbine rotor (not shown), situated in their middle and rotating about the axis R, is fed with more or less exhaust gas of a combustion motor which is supplied through a supply channel 9 and is discharged through a central pipe 10. When the turbine rotor rotates, the compressor rotor (not shown) at the other end of the shaft 18 is driven by it. The mechanism for adjusting the position of the vanes 7 may be of any kind known in the art. In general, it will be actuated by a control device 12 where the control movements of a membrane located in it are transferred to a push-rod member 14 connected to the membrane. The push-rod member 14 comprises a spherical bearing 11 in which a crankpin 13 of a crank lever 15 is supported. The crank lever 15 is connected to an adjustment shaft, as known per se, which in FIG. 1 is not shown (because it is in a plane differing from that of FIG. 1), but is illustrated in FIG. 2. From this adjustment shaft, the control movement can be transferred to the pivoting shafts 8, and via levers mounted on the pivoting shafts 8 or via toothed sectors or in any other way to the guiding vanes 7. The rotor shaft 18 is supported in a conventional manner and in any fashion known per se in the bearing housing 4, the nature of the bearing and the detailed construction being not critical for the present invention.

The bearing housing 4 ends toward the turbine housing in an end flange 5 which is inserted into a corresponding recess or opening of the turbine housing before these two housing parts 2, 4 are fixed together by means of the screw bolts 20. A holding ring or simply a shim 16 for each screw bolt 20 may either be screwed to the flange 5 or may be integrally cast. This holding ring 16 fixes a sealing ring 17 of about square cross-section, which is inserted into a correspondingly square groove of the turbine housing 2. The holding ring 16 may, however, serve in addition for mounting the bearing housing 4 to the turbine housing 2 to fix the relative axial position of the bearing housing 4 relative to the turbine housing 2.

This arrangement is best seen in FIG. 2 where the sealing ring 17 is clearly visible between the holding ring 16 and a shoulder or groove 23 of the turbine housing 2. The sealing ring 17 engages, in this embodiment, the outer periphery of the flange 5, but could also engage a surface, which faces the turbine housing 2 in axial direction. Of course, a combination of both sealing facilities could be provided within the scope of the present invention.

Because the flange 5 forms the fastening end of the bearing housing 4, the entire opening of the turbine housing 2, into which the bearing housing 4 is inserted, is covered by this flange 5, while the interconnection between both housing parts 2, 4 is sealed by the sealing ring 17. Because, as has been mentioned above, very high temperatures are prevailing within the turbine housing 2 which heat is transferred, of course, to the interconnections at 5, 16 and 23, the sealing 17 is also exposed to such high temperatures for which reason it consists of a heat resistant material, preferably of a mineral material or a metal. For only in this way can it fulfill its function during an acceptable period.

Investigations have shown, however, that leakage could also occur through the bearing of the adjustment shaft 24 connected to the crank lever 15. The situation in the region of this adjustment shaft 24 is shown in FIG. 2. Accordingly, the adjustment shaft 24 has at its left side (with respect to FIG. 2) a shaft end 25 of reduced diameter onto which the crank lever 15 is fastened, for example by shrinking it on. At the end shown at right in FIG. 2, the adjustment shaft can have an eccentric 26 which extends into an opening of an adjustment or unison ring 27 in order to achieve an adjustment of the position of the guiding vanes 7 by a turning movement of this unison ring 27, as is known per se.

This adjustment shaft 24 is, thus, supported by the end flange 5 of the bearing housing 4 in a bearing sleeve 28. This bearing sleeve 28 is, as shown, two partite in axial direction, i.e. it consists of a left axial part 29 at the side of the bearing housing 4 and a right axial part 30 at the side of the turbine housing 2. Between these axial parts 29, 30 is a sealing ring 31, preferably of graphite, or another heat resistant mineral material which preferably is (relative) easily deformable When mounting the sleeve or bushing 28 and the adjustment shaft 24, the shaft 24 together with one, e.g. 29, of the axial parts of the sleeve 28 is inserted from one side, while the sealing ring 31 and the other axial part 30 of the sleeve 28 is inserted into the flange 5 from the other side. Or, in short, the shaft 24 together with the two axial parts 29, 30 and the sealing ring 31 in-between are inserted from both sides into the flange 5 (in the present embodiment, it would also be possible to support the shaft in the end wall of the turbine housing or in both).

The sealing ring 31 has preferably a wider axial length than shown in FIG. 2 and which would correspond, together with the axial parts 29, 30, to the width of the flange 5. Therefore, the axial part 29 will project over the surface of the flange 5 to the left, while the axial part 30 will project over the surface at right. If one then applies pressure to these two projecting parts 29, 30, the pressure will be transmitted to the deformable sealing ring 31, which yields laterally towards the shaft 24 and (as much as possible) upwards, thus filling all gaps that could, in case, be the cause of a leakage. It will be understood that the use of a graphite ring 31 is particularly useful due to lubricating effect to the shaft 24 achieved at the same time. After having upset the mineral sealing ring 31, the position of one or the other axial sleeve parts 29, 30 may be secured by a key, a fastening ring 32 or the like.

It will be understood that it would likewise be possible to make the sleeve 28 project only to one side of the flange 5 before pressure is exerted to just this side. Furthermore, it will be understood that the sealing 31 needs not to be annular in any case, but could simply be filled as a powder or as granules into the hollow space formed by marginal projections or cylinders 34, for example after having inserted the adjustment shaft 24 into the axial sleeve parts 29 and 30. However, a slack filling is less advantageous, because it would have to be packed and stuffed in a stronger manner, i.e. more pressure would have to be exerted. Moreover, it could be sufficient to provide a hollow cylindrical axial projection 34 only on one of the axial parts 29, 30, but preferably somewhat longer. Those skilled in the art will also appreciate that this hollow cylinder 34 has also the advantage, besides in the course of mounting, to direct the pressure force, which acts onto the axial parts 29, 30 and, thus, onto the graphite ring 31, towards the adjustment shaft 24, because it is the gap between its peripheral surface and the sleeve 28 which has primarily to be sealed, whereas the sleeve 28, in general, will be press fitted into the flange 5 so that leakage in this region is not so great a problem. In this sense, the marginal projections 34 act as a guiding surface for the getting out movement of the graphite (or other material) to direct this sealing material towards the place where a possible gap has to be sealed.

If it were the case to be desired for reasons of production technique, it would also be possible to shorten the marginal projections 34 so that a gap remains between their front surfaces into which the mineral material of the sealing 31 may enter. In some cases, the marginal and axial projections 34 may be omitted at all.

Furthermore, the dimensions of the axial sleeve parts 29, 30 have not necessarily to be such that they project over the surface of the flange 5. For example, they could first be aligned and then pressed into the flange bore so that a cylindrical recess remains. In such a position, securing them could be effected by a screw, such as a worm screw. However, in general this will not be desired.

Figure 3:
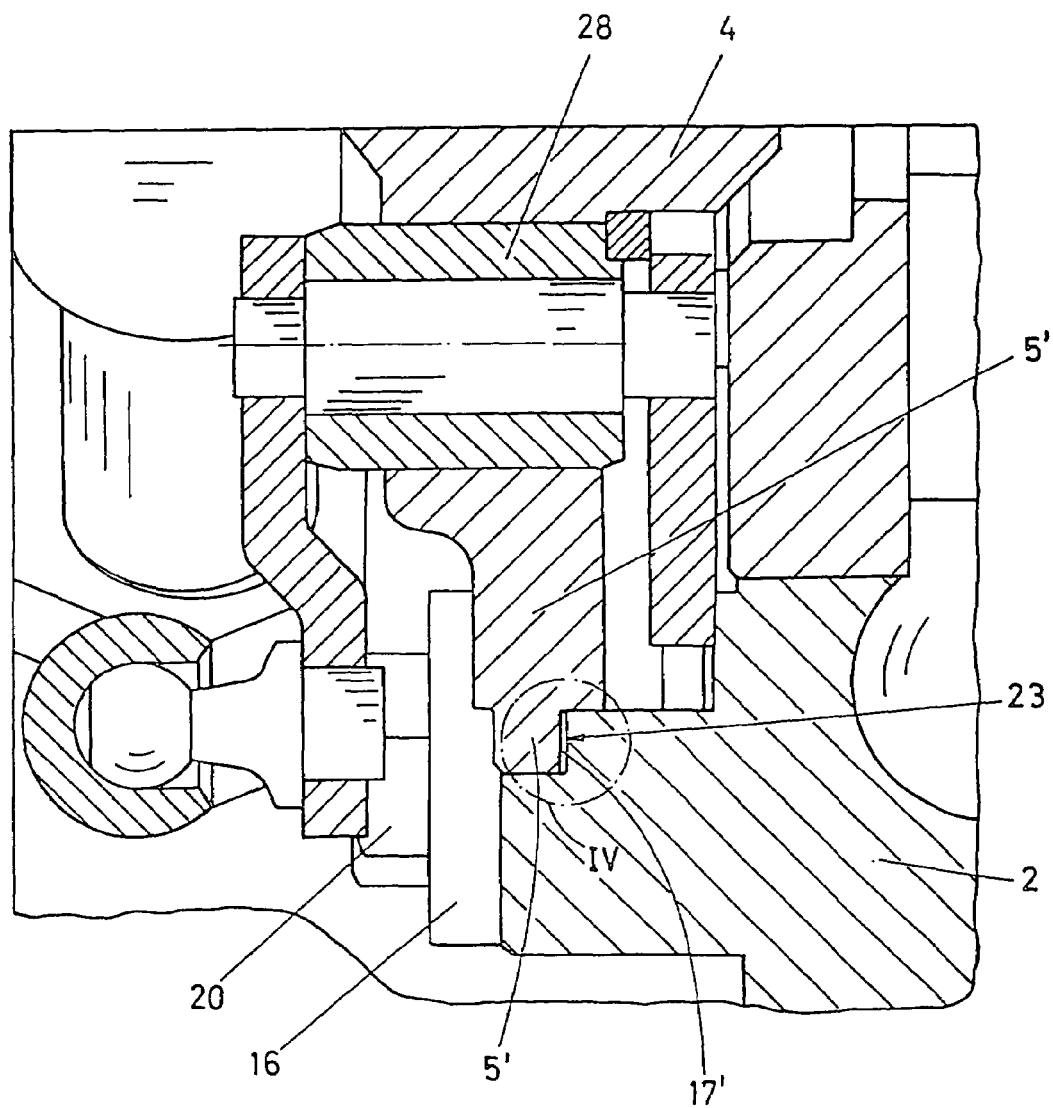

FIG. 3 is similar to FIG. 2, but instead of a sealing ring 17 of about square cross-section joining the end flange 5, this end flange 5 is prolonged in such a way that an outer ring 5' extends into the groove or shoulder 23 of the turbine housing 2 which has already been mentioned. Between this outer ring 5' and the groove 23 is a sealing ring that is flat after having been mounted. In principle, this could be considered sufficient for sealing the region IV, but preferably a sealing ring 17' is used, as will be described below with reference to FIG. 4. It should only be mentioned here that the bearing sleeve 28 is formed as one piece in this embodiment, but could be made in two (or more) parts, as has been described with reference to FIG. 2.

Figure 4:
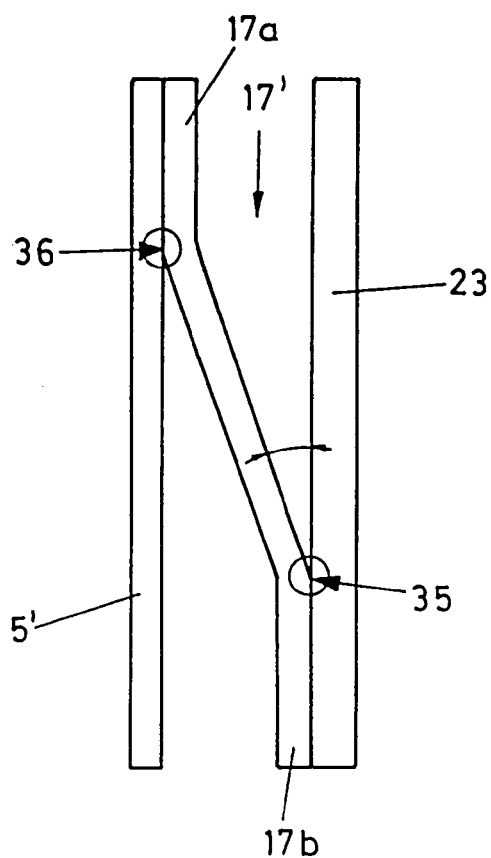
FIG. 4 illustrates a detail IV of FIG. 3 at an enlarged scale and during assembling.

FIG. 4 shows the detail IV of FIG. 3 at an enlarged scale during mounting, i.e. during the approach of the outer ring 5' to the opposite wall of the groove 23, when the sealing ring 17' is in-between. In this position, the sealing ring 17' is in a still released condition and shows that it has at least a half-crimp (i.e. without a return to one of the two vertical plains with reference to FIG. 4 including sealing portions 17a and 17b), which results in an about Z-shape, having two inflection points 35, 36. It is possible within the scope of the present invention to provide a whole crimp, i.e. a kind of convex bulge of the sealing ring 17' or even a plurality of them, but the advantage of using a sealing ring forming a half-crimp, as shown in FIG. 4, will become apparent from the following.

First, FIG. 4 shows that using such a half-crimp the two portions 17a, 17b engage the assigned surfaces of the outer ring 5' and the groove 23 over there whole surface, i.e. the are flat on these surfaces, thus ensuring a relative large sealing surface (as compared with a mere convex bulge). It has to be considered that, due to the high temperatures in this region, silicone or similar sealings cannot be used, but a flat metal ring (or a mineral ring). In the embodiment shown, the flat metal sealing is situated in the position where the main forces between the end flange 5 and the bearing housing 4 act (see the position of the screw bolt 20 generating the force and the force transmitting holding ring 16) so that, when tightening the screw bolt 20, the screw force is transmitted through the end flange 5 of the bearing housing 4 and the sealing ring 17' onto the wall of the groove 23 of the turbine housing 2. Having assembled the sealing ring 17', the bearing housing 4 (and its end flange 5) has no direct contact to the turbine housing 2, but the portions 17a, 17b of the half-crimped sealing 17', now being pressed flat and being in the position shown in FIG. 3, provide a good sealing between these parts. The advantage of such a half-crimped sealing 17' reside in the possibility that it may be sufficient to have small tightening forces by the screw bolts 20 and the small engaging surfaces of the portions 17a, 17b of the sealing ring 17'.

Figure 5:
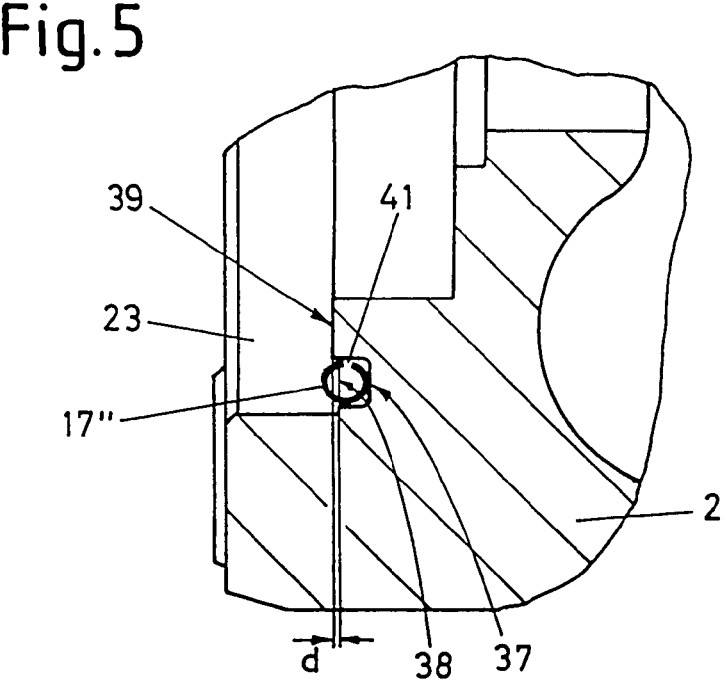
FIG. 5 represents a further variant.

It has been mentioned above that the sealing ring 17 or 17' could form a bulge. FIG. 5 shows such a particular and favorable embodiment of a bulging sealing ring 17", as may be used within the scope of the present invention. FIG. 5 illustrates merely the turbine housing 2, before the bearing housing (4 in the previous figures) has been mounted and the end flange (or other similar end portion of the bearing housing 4) has been inserted into an opening or recess of the turbine housing 2, or into the groove 23. In the embodiment of FIG. 5, an annular groove 37 is machined in the region of the groove or shoulder 23. A radial outer surface 38 facing the end flange (not shown) is preferably offset by a distance d to the rear with respect to a surface 39, which faces and engages the end flange (5' in FIG. 3).

A bent sealing ring, unilaterally open at 41 so as to have the shape of letter C, is inserted into the groove 37. Preferably, the slot-like opening 41 extending over the circumference of the sealing ring 17" is in a radial plane (with respect to the axis R of FIG. 1) so that this opening 41 will be closed in a defined manner when assembling the parts due to the pressure of the end flange 5 of the bearing housing 4. It is convenient if the opening 41 is oriented inwards in radial direction, i.e. towards the axis of rotation R. In principle, it would also be possible to orient the opening 41 in axial direction, but this is not so advantageous because of the increased friction due to the pressure exerted by the screw bolts 20 (see FIG. 3) which would resist to closing the opening 41. However, it will be appreciated by those skilled in the art that the latter approach would be preferred in a case where the design is such that a larger gap has to be sealed. In principle, the embodiment shown does not impede the axial contact between the bearing housing (4 in FIG. 3) and the turbine housing 2, thus being in the by-pass flux of forces. It will be understood that it is also possible, in general, to form the annular groove 37 in the end flange 5' and to insert there the sealing ring 17".

Numerous further modifications are conceivable within the scope of the present invention. For example, more than one sealing ring could be used. Sealing could also be enhanced by providing a labyrinth-like construction, e.g. as an addition. The sealing ring 17 may be formed of mica, graphite or a metal in one of the shapes described above.

| Reference List | |
|---|---|
| 1 Turbocharger | 2 Turbine Housing Part |
| 3 Compressor Housing Part | 4 Bearing Housing Part |
| 5 End Flange | 6 Nozzle Ring |
| 7 Guiding Vanes | 8 Shafts |
| 9 Supply Channel | 10 Central Pipe |
| 11 Spherical Bearing | 12 Control Device |
| 13 Crank Pin | 14 Push-Rod Member |
| 15 Crank Lever | 16 Holding Ring |
| 17 Sealing Ring | 18 Rotor Shaft |
| 19 Screw Bolts | 20 Threaded Bolts |
| 21 Flange | 22 Sealing Ring |
| 23 Groove | 24 Adjustment Shaft |
| 25 Shaft End | 26 Eccentric |
| 27 Unison Ring | 28 Bearing Sleeve |
| 29 Axial Part | 30 Axial Part |
| 31 Sealing Ring | 32 Fastening Ring |
| 33 Wall | 34 Projections |
| 35 Inflection Point | 36 Inflection Point |
| 37 Groove | 38 Surface |
| 39 Surface | |

What is claimed is:

1. A turbocharger (1) comprising:
a shaft (18) for mounting one rotor on each end thereof,
a bearing housing (4) for supporting said shaft (18), and
a turbine housing (2), an opening of which is arranged opposite the bearing housing (4), wherein an end portion (5) of the bearing housing (4) can be fastened on wall portions(33) of the turbine housing which are adjacent to said opening,
wherein an area between said end portion (5) of the bearing housing (4) and the turbine housing (2) has at least one refractory sealing (17, 31) of mineral material or metal, and
wherein the refractory sealing of mineral material or metal (17, 31) is selected from the group consisting of mica, graphite and metal.

2. The turbocharger according to claim 1, wherein said bearing housing (4) includes a flange that can be inserted into a recess in the complementary wall portion (33), and
wherein the refractory sealing (17), which comprises a mineral or metallic material, is located between said flange (5) and said recess in the wall portion (33).

3. The turbocharger according to claim 2, wherein said sealing (17), which constitutes a ring, is positioned against an outwardly facing surface of the flange (5), wherein said outwardly facing surface of the flange (5) is the flange's (5) peripheral surface.

4. The turbocharger according to claim 2, wherein said sealing (17, 17', 17") is positioned against a surface (5') of the flange (5) of the bearing housing (4), wherein said surface (5') faces the turbine housing (2), wherein said surface (5') is a surface oriented in an axial direction, and
wherein said ring sealing (17') constitutes a crimped ring having two sections (17a, 17b) which abut flat onto respective surfaces (5' and 23) of the bearing housing (4) and the turbine housing (2).

5. The turbocharger according to claim 4, wherein said ring sealing (17') constitutes a half-crimped ring.

6. The turbocharger according to claim 4, wherein said ring sealing (17") is bent in cross section, has a circumferential slot (41), and is positioned against an open circular groove (37) of one of the housings (4).

7. A turbocharger (1) comprising:
a shaft (18) for mounting one rotor on each end thereof,
a bearing housing (4) for supporting said shaft (18), and
a turbine housing (2), an opening of which is arranged opposite the bearing housing (4), wherein an end portion (5) of the bearing housing (4) can be fastened on wall portions(33) of the turbine housing which are adjacent to said opening,
wherein an area between said end portion (5) of the bearing housing (4) and the turbine housing (2) has at least one refractory sealing (17, 31) of mineral material or metal, and
wherein said turbocharger comprises a guiding grid of variable turbine geometry, which can be controlled by means of a control shaft (24), which is supported by the turbine housing (2) or by the bearing housing (4), and wherein said control shaft (24) is received within a divided bushing (28) between two parts (29, 30), wherein said sealing of mineral material or metal is positioned.

8. The turbocharger according to claim 7, wherein said sealing is graphite.

9. The turbocharger according to claim 7, wherein at least one of the parts (29, 30) of bushing (28) comprises a hollow cylindrical edge projection (34), which accommodates said sealing (31).

10. A method of manufacturing a turbocharger, wherein said turbocharger comprises a guiding grid of variable turbine geometry, which can be controlled by means of a control shaft (24), which is supported by the turbine housing (2) or by the bearing housing (4), and wherein said control shaft (24) is received within a divided bushing (28) between two parts (29, 30), wherein said sealing of mineral material or metal is positioned, comprising:
introducing the control shaft (24) and said two bushing parts (29, 30), having said broader, deformable sealing (31) between said bushing parts (29, 30), into flange (5), wherein at least one of said bushing parts (29, 30) projects beyond said flange (5), and
applying pressure onto said one projecting bushing part such that said pressure is communicated to said sealing (31), whereupon said sealing fills orifices.

11. The turbocharger according to claim 6, wherein the circular slot (41) is oriented within a radial plane, and is turned radially inward with reference to the turbine shaft.

* * * * *